US006175625B1

(12) United States Patent
Safford et al.

(10) Patent No.: US 6,175,625 B1
(45) Date of Patent: Jan. 16, 2001

(54) CONTROL CIRCUITS FOR ELECTRIC CODING MACHINES

(75) Inventors: Laurance F. Safford; Donald W. Seiler, both of Washington, DC (US)

(73) Assignee: The United States of America as represented by the National Security Agency, Washington, DC (US)

(*) Notice: Under 35 U.S.C. 154(b), the term of this patent shall be extended for 0 days.

(21) Appl. No.: 02/568,368

(22) Filed: Dec. 15, 1944

(51) Int. Cl.[7] .............................. H04L 9/38; H04L 9/10; H04L 17/02; H04L 17/16

(52) U.S. Cl. .............................. 380/26; 380/287; 380/52; 380/56; 380/57; 380/59; 341/50; 341/90; 341/91

(58) Field of Search ...................................... 380/255, 259, 380/270, 287, 26, 51, 52, 55, 56, 57, 58, 59, 27, 47; 341/90, 91; 178/17 A

(56) References Cited

U.S. PATENT DOCUMENTS

| 1,540,107 | * | 6/1925 | Damm ..................................... | 380/52 |
| 2,116,683 | * | 5/1938 | Lemmon et al. ....................... | 380/55 |
| 2,116,731 | * | 5/1938 | Noll ....................................... | 380/55 |

* cited by examiner

*Primary Examiner*—Bernarr E. Gregory

(57) ABSTRACT

The machine involves code wheels in cascade or in a maze with random or mixed circuits which operate a printing device to print the cipher conjugate of the letter on an operated key when the keyboard is connected to one end of the code wheel maze, and to print the plain conjugate of the letter in cipher when a key bearing such letter is operated with the keyboard connected to the other end of the code wheel maze. The printer is connected to the end of the code wheel maze opposite the end to which the keyboard is connected in both cases.

21 Claims, 5 Drawing Sheets

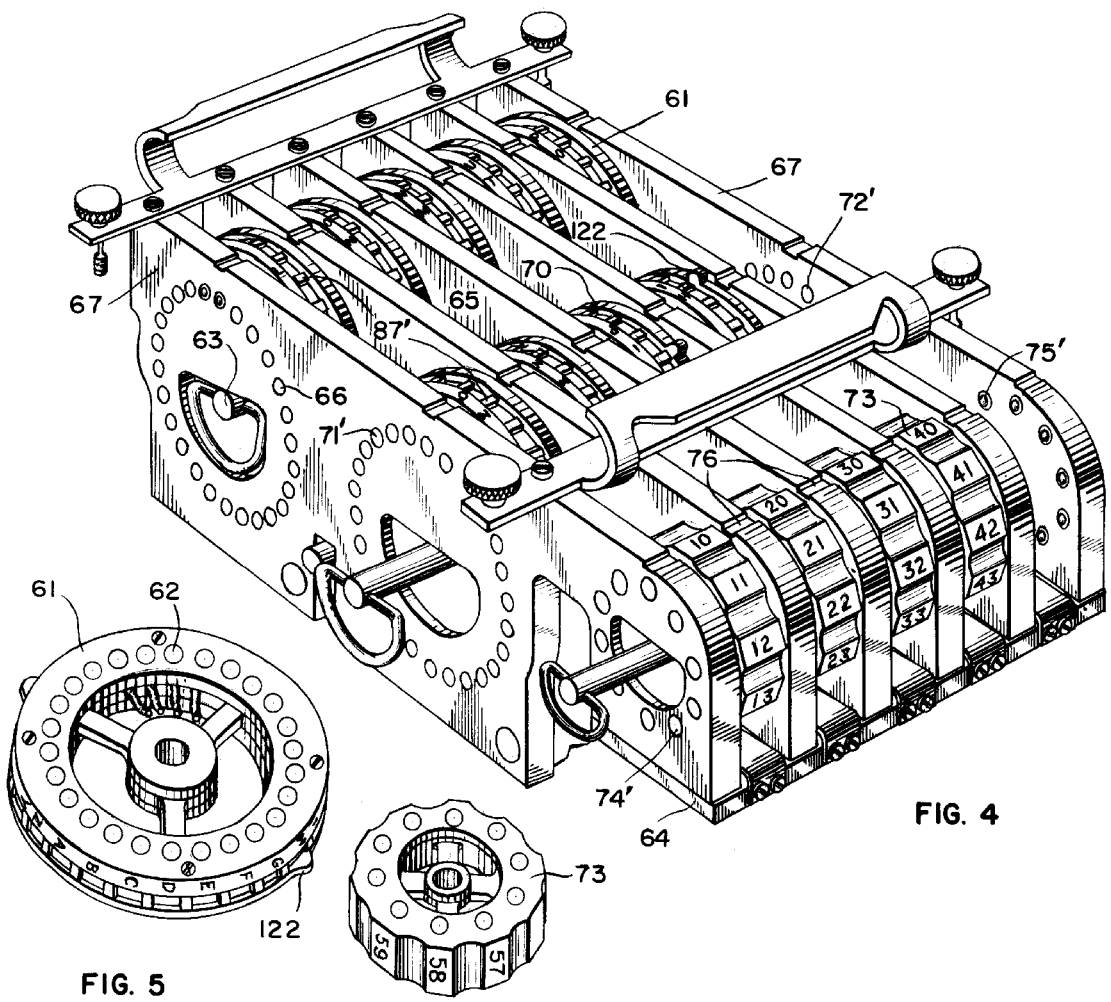
FIG. 4
FIG. 5
FIG. 6
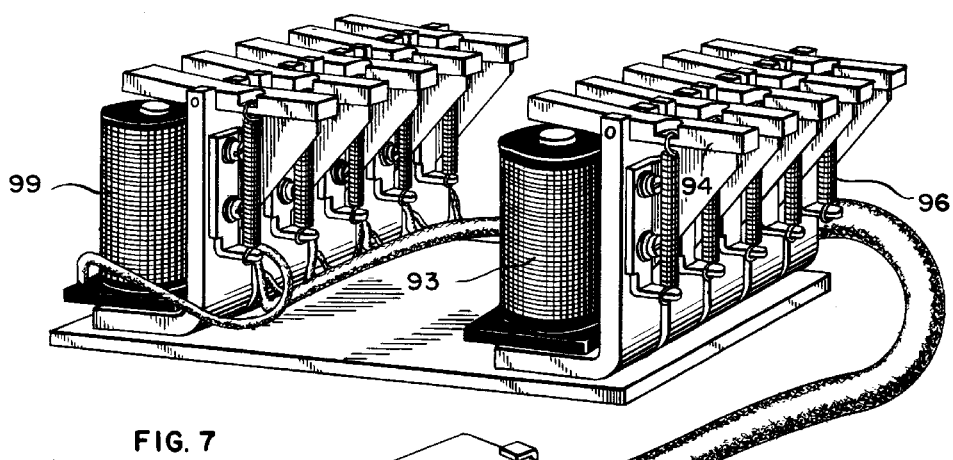
FIG. 7
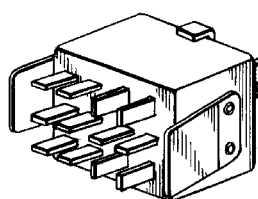

CONTROL CIRCUITS FOR ELECTRIC CODING MACHINES

The invention described herein may be manufactured and used by or for the Government of the United States of America for governmental purposes without the payment of any royalties thereon or therefor.

This invention relates to electrical circuits for controlling the operation of the mechanical elements of a cryptographic machine.

Among the several objects of this invention are:

To provide means for changing the circuits of a cryptographic machine to condition them for enciphering, deciphering or writing plain text and numerals;

To devise circuits to control the mechanical operating elements of a cryptographic machine to introduce a very high degree of complexity and unpredictability into the selection of such elements for operation;

To provide means for cutting out the ciphering circuits and cutting in circuits for controlling the mechanical operation only;

To provide a switch having four operating positions to condition the circuits in groups to perform different functions requisite in the electromechanical encipherment and decipherment of messages;

To devise a second switch to cooperate with the aforesaid switch in condition circuits to separate purely mechanical functions of a cryptographic machine from those involved in recording textual matter.

BRIEF DESCRIPTION OF THE DRAWINGS

Other objects will become manifest when the ensuing description is read in connection with the drawings, in which:

FIG. 4 is a perspective view of the code and control wheel unit with one control wheel and one index wheel removed;

FIG. 5 shows a wheel used in either the code wheel or the control wheel set;

FIG. 6 depicts an index wheel;

FIG. 7 illustrates the electromagnets, with their armatures, that control the operation of the mechanism in FIG. 3.

DETAILED DESCRIPTION OF THE INVENTION

The cryptographic machine with which the proposed invention is concerned is an improvement of that shown in the application of Larsen et al, Ser. No. 02/317,454 filed Feb. 5, 1940, now U.S. Pat. No. 4,155,659. Other related applications disclosing various aspects of the improved machine, more or less dependent on the present invention and filed concurrently herewith will be identified in the course of the description.

As used herein "cipher conjugate" is the letter, which may be any letter in the alphabet, printed in the enciphered text when a key is operated during the process of encipherment and the "plain conjugate" is the letter that is printed in the deciphered text when the key bearings its cipher conjugate is operated during deciphering.

Broadly delineated, the machine involves "code wheels" in cascade or in a "maze" with random or mixed circuits which operate a printing device to print the cipher conjugate of the letter on an operated key when the keyboard is connected to one end of the code wheel maze, and to print the plain conjugate of the letter in cipher when a key bearing such letter is operated with the keyboard connected to the other end of the code wheel maze. The printer is connected to the end of the code wheel maze opposite the end to which the keyboard is connected in both cases.

The switches and circuits herein concerned are manipulated to reverse the connections for enciphering and deciphering, to connect the keys directly to the printer for printing plain text, and to cut out the printing and ciphering circuits and to connect certain other circuits that control mechanical devices for resetting and zeroizing, as will be fully explained hereinafter.

The construction of the machine will be first set forth to make clear the functions and relations of the electrical circuits.

Figure 1:
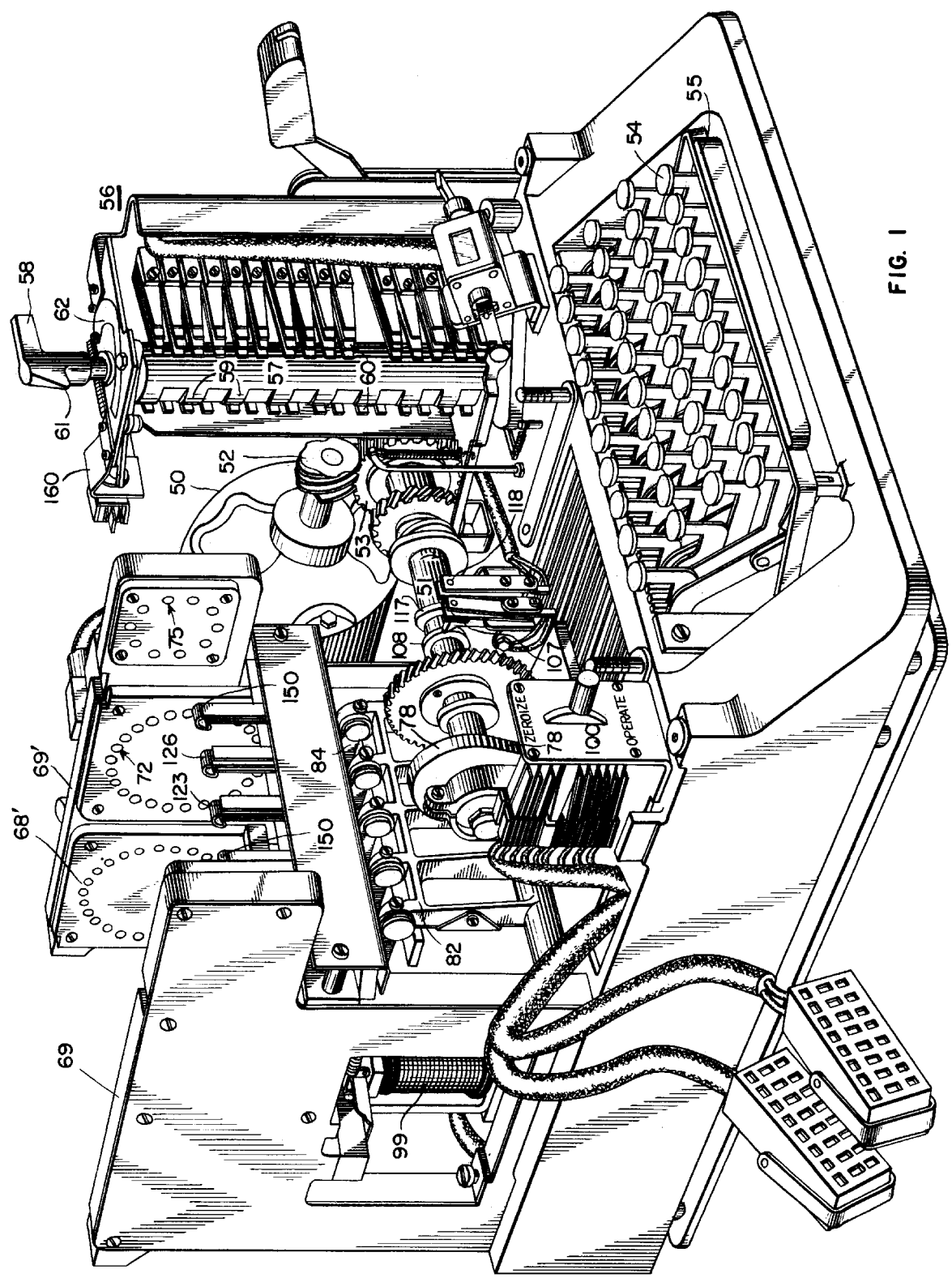
FIG. 1 is a perspective elevational view showing a coding machine with the code and control wheel unit removed.

Referring to FIG. 1, motor 50 drives shaft 51 through worm pinion 52 meshed with worm gear 53 on the shaft to supply power for operating the mechanical elements of the machine under control of the electrical circuits. Shaft 51 and the means for determining the operation thereof are set forth in detail in the application of Theodore I. Przysiecki, Ser. No. 02/568,365, filed Dec. 15, 1944. The key board has keys 54 for the letters of the alphabet, the numerals 1 through 9 and zero, blank, dash and repeat, and space bar 55.

Main switch 56 has a shaft 57 that is rotatable by handle 58 with cam lobes 59 on the shaft to contact telephone type pileups 60. The shaft 57 has five positions, indicated by index 61 in conjunction with marks on plate 62, which positions are "Off," "Plain," "Reset," "Encipher," and "Decipher." In the first or "Off" position all current is cut off from the machine. The second position of switch 56 connects the alphabet and numeral keys directly to the printing mechanism, shown in the application of Krum and Thienemann, Ser. No. 02/568,366 filed Dec. 15, 1944, now U.S. Pat. No. 4,185,928. The third or reset position of switch 56 actuates pileups 60 in such a manner that all ciphering circuits and those to the printer are opened and other circuits are closed to effect mechanical operations for mechanically setting the code wheels to predetermined initial positions. In the fourth position the pileups 60 are actuated to close the circuits for enciphering, and in the fifth for deciphering.

Code wheel 61, as shown in FIG. 5, has an annular series of contacts 62 on each face so disposed that one contact on each face corresponds to a letter on the periphery of the wheel. Each contact of one face is connected at random, or as otherwise determined, to a contact on the opposite face, as is well known in this art, and indicated at 77 in FIG. 2a. The code wheels 61 are assembled in a set (five in FIG. 4) on a spindle 63 readily removable from basket 64 to facilitate the interchange of wheels. The spacer 65 between each two code wheels is provided with an annular series of spring pressed plunger conducting members (not shown) extending through to connect the contacts in one wheel 61 to those in the adjacent wheel. Basket 64 is disposed in the machine so that the conducts 66 in the two side members 67 of the basket establish conductive relations with contacts 68 in the left side member 69 of the frame of the machine and with contacts 68' in the right side member 69' and thus make complete through paths from one side member 69 through the wheels 61 and spacers 65 to the member 69'.

The five control wheels 70 are identical with the code wheels 61 in structure and manner of assembly in the basket 64 to establish through paths between the contact series 71 and series 72 in side members 69 and 69' by way of contact series 71' and 72' in basket 64. Also assembled in basket 64 are index wheels 73, each of which has ten random or mixed connections between its faces to set up through paths between the contact series 75 and series 74 through contact series 75' and 74', respectively. The five index wheels 73 are rotatable but are set manually in one position at the beginning of enciphering or deciphering a message and remain without change. In FIG. 4, four index wheels shown are set with the respective numbers 10, 20, 30, and 40 alined with reference line 76 in the spacers and side members of the basket 64, the fifth being removed to show contacts 75'.

It will of course be understood that other numbers of code wheels, control wheels and index wheels may be used as well as other numbers of contacts on the aforesaid wheels, and that the number of code wheels, control wheels and index wheels need not be the same.

Fixed upon shaft 51 is member 78 having formed in one face a cam-groove 79 (FIG. 3) in which is disposed a follower 80 attached to a bell crank lever 81 that is part of a rocking bail 82 mounted on shaft 83. Pivoted to bail 82 are five stepping drive bars 84 each of which underlies a code wheel 61 and the control wheel 70 alined therewith.

Each drive bar 84 has pivotally mounted thereon a bell crank lever stepping pawl 85 having an arm 86 disposed to be engageable with the teeth 87' on the periphery of the respective code wheel 61 or control wheel 70, as the case may be, with which it is associated, a spring 87 biasing each pawl 85 to swing the arm 86 toward the wheel. Pivoted on the drive bar 84 adjacent each pawl 85 is a stepping pawl latch 88 having two shoulders 89 and 90 thereon that are engageable with the arm 91 of pawl 85, the spring 92 being provided to move the latch 88 into engagement with arm 91. An electromagnet 93 has a pivoted armature 94 with one end disposed under the arm 95 of latch 88 and biased away from that arm by spring 96.

Figure 3:
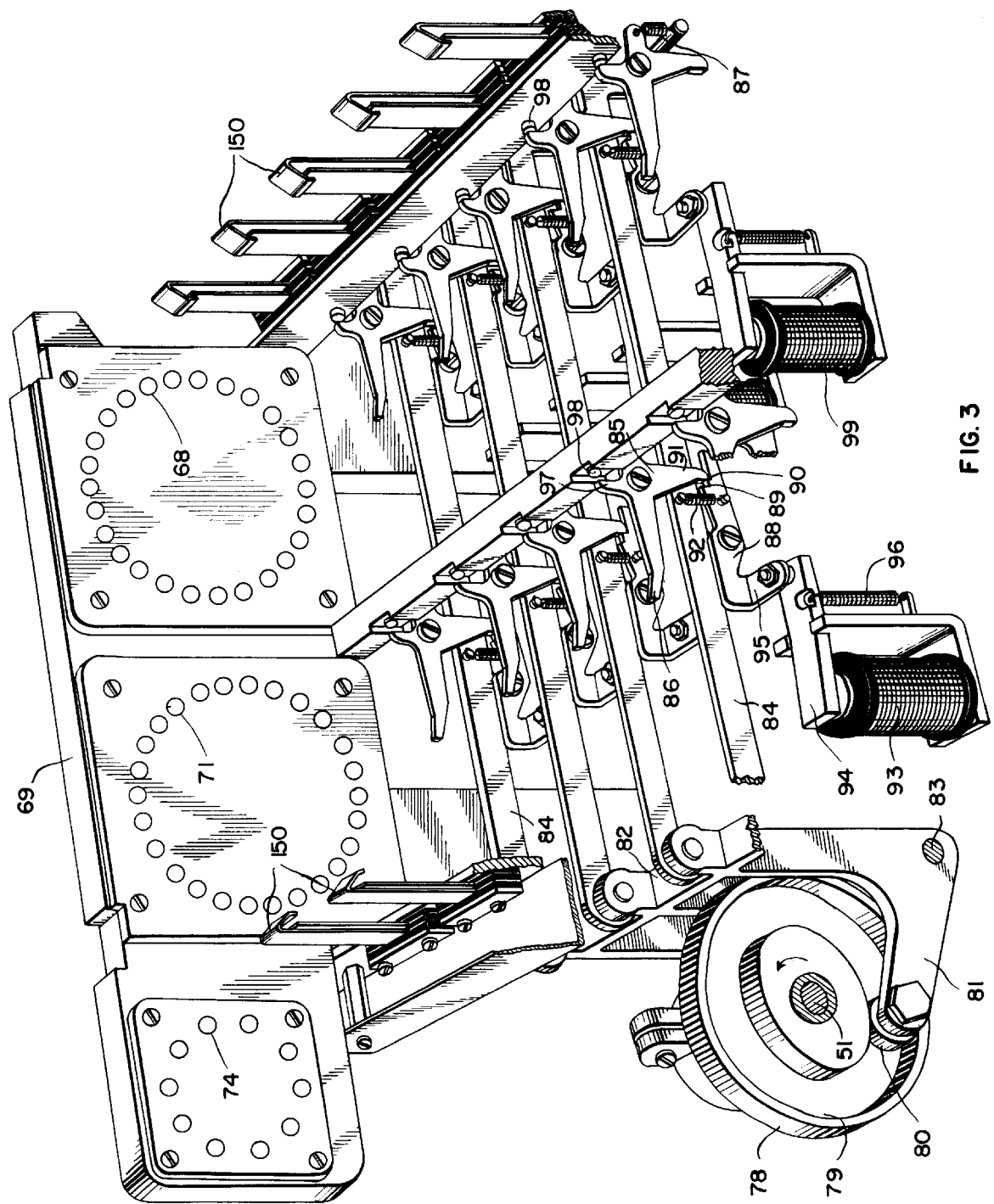
FIG. 3 illustrates the mechanism for stepping the code and control wheels.

When the parts are as shown in FIG. 3 and the magnet 93 is energized by a pulse of current, the armature 94 is drawn toward the magnet and latch 88 is rotated clockwise through contact of arm 95 with the end of armature 94. This releases arm 91 of pawl 85 from the shoulder 90 and permits the pawl to be rotated clockwise by its spring 87 so that the arm 86 engages a tooth 87' on the wheel associated therewith, the rotation of pawl 85 being limited by contact of arm 91 with shoulder 89. Subsequently, the rotation of cam 78 moves the bail 82 toward the left in FIG. 3 and the movement thus imparted to drive bar 84 caused the wheel associated with the pawl 85 to be rotated one step. Continued rotation of cam 79 moves bail 82 toward the right and causes arm 97 of pawl 85 to contact the reset pin 98 which rotates pawl 85 backward and effects re-engagement of arm 91 with shoulder 90 so that the arm 86 is held away from the associated wheel until the mechanism is again tripped by a pulse of current to magnet 93. The banks of magnets 93 for operating the control wheels and magnets 99 for operating the code wheels are shown in detail in FIG. 7.

Figure 2:
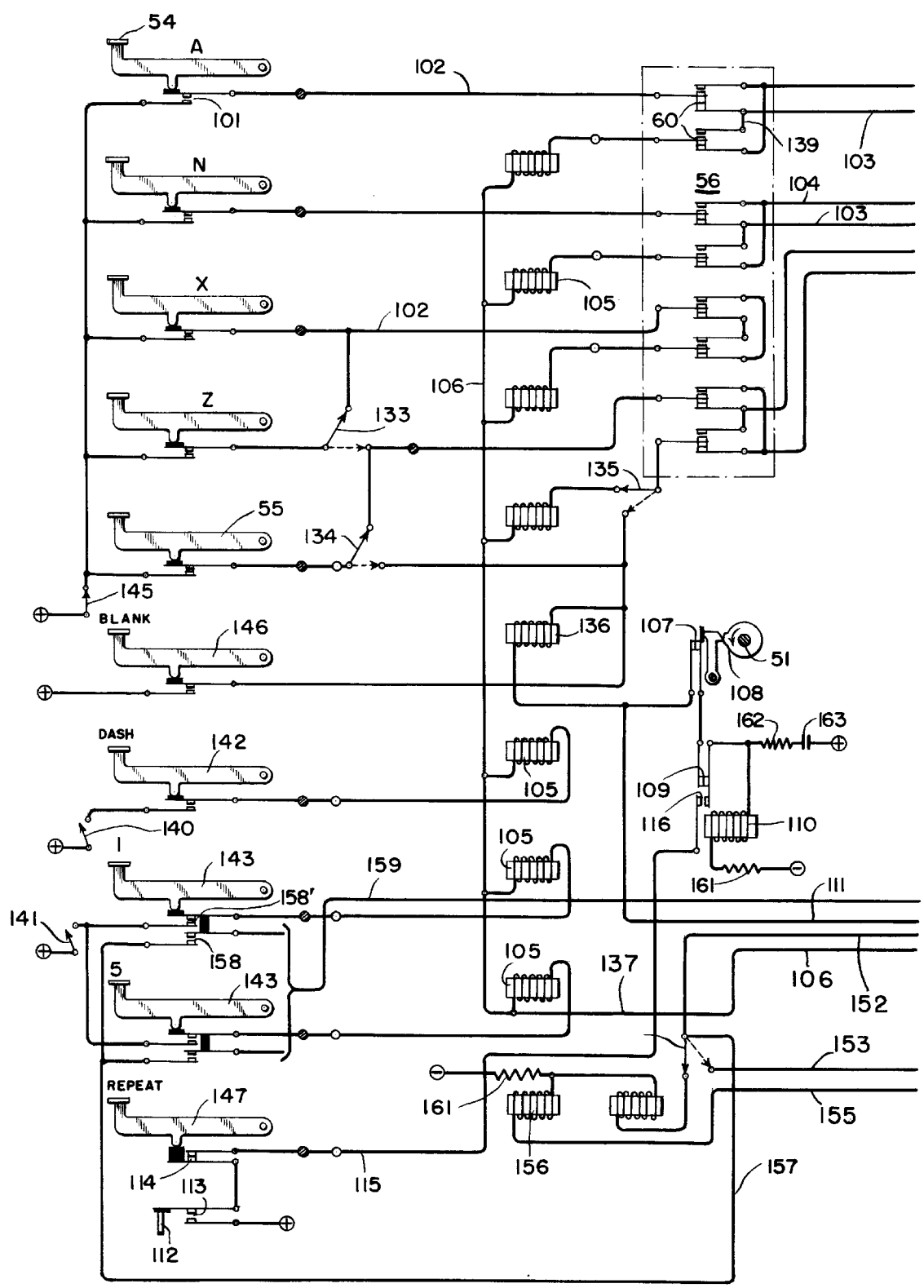
FIGS. 2 and 2a are together a schematic lay-out of the electric circuits.
Figure 2A:
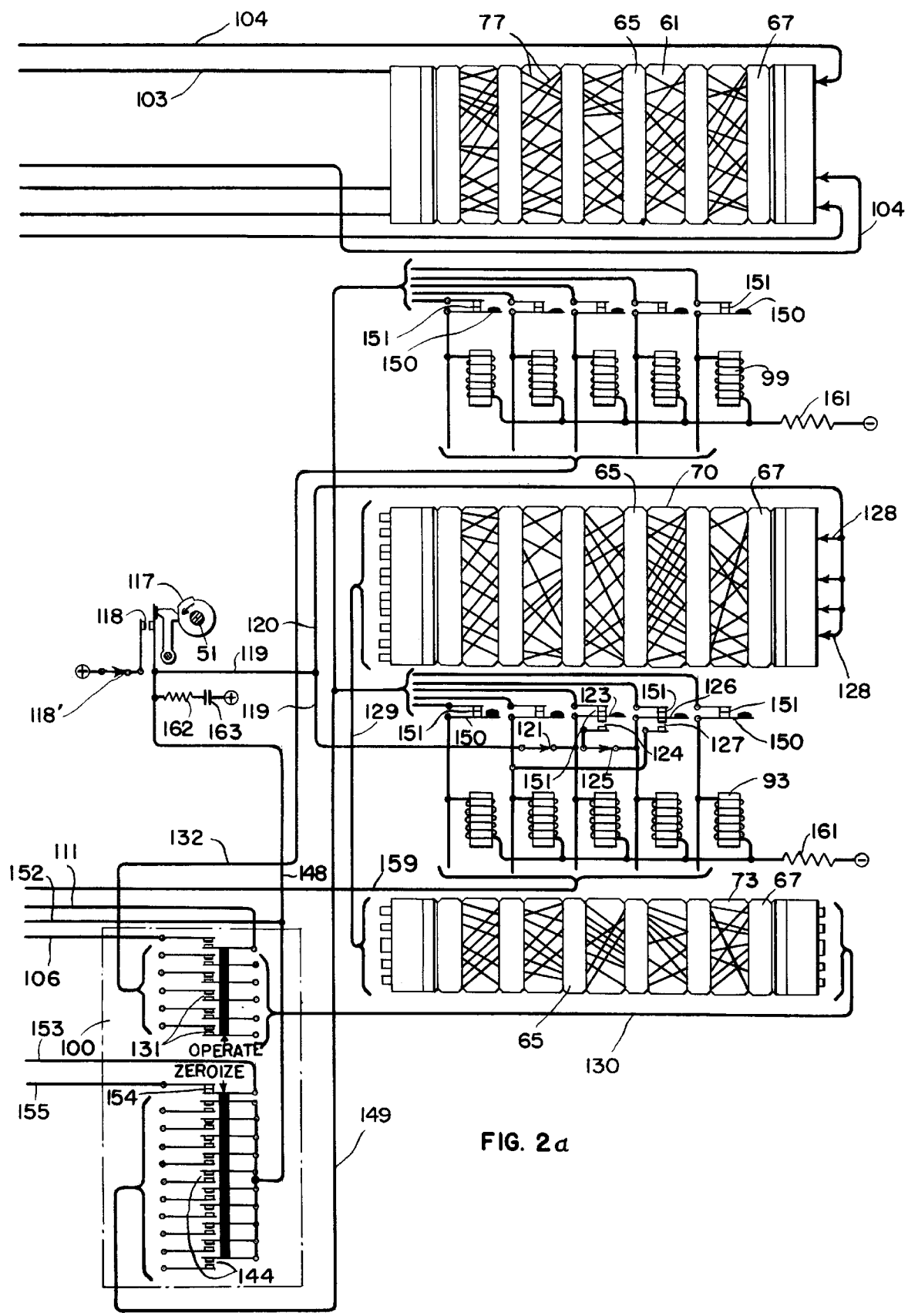

FIGS. 2 and 2a will be considered together, since they present a schematic layout of the electrical circuits. While the system is described as using direct current, it is to be understood that due to the fact that all electromagnets have a trigger action, so that a pulse of current is sufficient to effect operating, alternating current may be used provided motor 50 is constructed to operate on that type of current. A second witch 100 is provided, herein termed the zeroizer switch, which has two positions, operate and zeroize. In the first of these it closes fie circuits from index wheels 73 to the stepping magnets 99 of the code wheels 61 and a circuit to control the driving shaft 51 and at the same time opens the zeroizer circuits. In the second position, zeroizer switch 100 opens the five circuits from the index wheels 73 to the stepping magnets 99 of the code wheels 61 and the shaft control circuit, and at the same time closes ten circuits to the five stepping magnets 99 of the code wheels 61 and the five stepping magnets 93 of control wheels 70 for resetting all these wheels to respective pre-determined initial positions, as will be more fully described.

The fourth position of switch 56 is "encipher." Each alphabet key 54 has an associated contact 101 that is closed when the key is depressed, completing a circuit from supply to a contact in a pileup 60 in switch 56, which switch is shown in FIG. 2 as set for enciphering. If the A key is operated, current passes through conductor 102 to switch 56 thence by conductor 103 to the A contact at the let hand end of the alphabet maze, thence by haphazard path through the wheels 61 and spacers 65 to, say, the N contact at the right hand end of the alphabet maze thence by conductor 104 and switch 56 to the N magnet 105 of the printer which sets the printer to record the letter N in the enciphered message.

The current then flows from printer magnet 105 through the common lead 106 to zeroizer switch 100, thence by conductor 111 to the printing timing contacts 107 which are closed by cam 108 on shaft 51 when the shaft is stopped after the completion of one revolution, and thence through the operating contacts 109 of clutch release magnet 110, which trips to engage the clutch (not shown) through which shaft 51 is driven and which is disengaged after each complete revolution of shaft 51.

Clutch trip magnet 110 also serves as a locking magnet to prevent a subsequent release of the clutch by operation of another key before a revolution of shaft 51 has been completed. Universal bar 112 underlies all the alphabet keys so that when any key is operated it is depressed. As is shown in FIG. 2, the universal bar 112 when not depressed holds contacts 113 separated but when it is moved downwardly these contacts close and establish a circuit through the contacts 114, conductor 115 and contacts 116 to clutch trip magnet 110. It is thus apparent that the magnet 110 will remain energized until universal bar 112 has again moved upwardly after release of a key.

After shaft 51 has turned through one-fifth of a revolution, the cam 108 has moved to permit contacts 107 to open, breaking the circuits through the code wheels 61 and the printing magnets 105; and at the same time cam 117 on shaft 51 closes contacts 118 to energize stepping magnet 93 of the third control wheel 70, counting from the left, by way of contact 121 that is closed while switch 56 is in the enciphering and deciphering positions, but open in all other positions. Thus this third wheel 70 turns one step each time a letter is printed during the processed of enciphering or deciphering.

The electric circuits are connected to insure the utmost degree of unpredictability in the changing of the paths between the alphabet keys 54 and the printing device during encipherment. This is accomplished by having one, two, three, or four of the code wheels 61 move one step after each time a letter is printed, the number of wheels 61 that move at any one time and the selection of the individual wheels 61 to be stepped being determined by the control circuits and particular positionings of the control wheels and index wheels. Code wheels 61 and control wheels 70 are interchangable and reversible, each having 26 contacts on each face, interconnected at random, such as A on one face to M on the other, B on one to G on the other, etc., but the arrangement of the connections is preferably not the same in any two wheels. Index wheels 73 have ten random or mixed connections between the faces of each, the wiring patterns in all being different. It will be noted that no mechanical means to step index wheels 73 is provided, they being set manually and remaining unchanged through the complete message.

Each of the wheels 61 and 70 has a peripheral boss 122 (FIGS. 4 and 5) which on the third control wheel, once each revolution, moves contact strip 123 to close a circuit through contacts 124 and 125 and connects wire 119 to the stepping magnet 93 of the fourth control wheel 70 and causes the fourth wheel to rotate one step. In its turn, the boss 122 on the fourth control wheel operates contact strip 126 to close contacts 127 and so connect the stepping magnet 93 of the second control wheel 70 to the wire 119, thus effecting meterwise operation of the third, fourth, and second control wheels. The first and fifth control wheels are not changed during the writing of one text but are set at prearranged positions. It will, of course, be understood that other stepping actions of the control wheels may be used and that the first and fifth control wheels are not necessarily motionless during the writing of one text.

The wire 120 is connected to four contacts 128 at the right hand end of the control wheels 70, so that four paths through the control wheels 70 are supplied with current. It will be understood that more or less than four contacts 128 at the right hand end of the control wheels 70 may be connected to the conductor 120. At the left hand end the twenty-six paths through the control wheels 70 are connected to nine leads. For example, one lead may be connected to six paths, one to five paths, one to four paths, two others to three paths each, one to two paths, and three others to one path each, so that the total is twenty-six. It is within the purview of this invention that other group combinations may be used so long as all twenty-six paths through the control wheels 70 are connected to the index wheels 73. The nine leads from the left hand end of the control wheels 70, designated generally by 129, are at their other ends connected to the left hand ends of nine of the ten paths through the index wheels 73, thus leaving one of the paths through the index wheels without a current supply connection. At the right hand end of the index maze the ten paths through index wheels 73 are connected, in groups of two, to five out-put leads designed generally by 130. It is thus apparent that, since there are but fourth paths through the control wheels 70 that carry current there can be no more than four of the conductors 130 that are supplied with current but, depending upon the fortuitous arrangement of the paths through the control wheels 70, there may be fewer than four. Due to the connection of the paths in groups as above described there will always be at least one of the output conductors 130 that will carry current. It is evident that other groupings of the right hand end contacts of the index wheel maze may be employed.

Each of the conductors 130 is connected through a respective pair of contacts 131 in switch 100 to a conductor 132 and thence to a respective stepping magnet 99 of the code wheels 61. Thus the number of the code wheels 61 that are moved at any one time depends upon the number of live conductors 130 at that time. A further clarification of the manner in which the magnets 99 are energized will be had by considering the connections between the right hand end of the index wheels 73 and the left hand end of control wheels 70. For example, two paths through index wheels 73 to which one of the conductors 130 is connected may be at their other ends connected to conductors 129 that are respectively in circuit with six paths and five paths through the control wheels 70, another conductor 130 may be connected to four paths and three paths through the wheels 70, still another to three paths and two paths, another to one path and one path, and the fifth to one path and zero paths through the control wheels 70.

While any number of input connections 128 may be used, experience has shown that the most advantageous number is less than the number of wheels being stepped through the index maze, in this case five. If five input connections are employed, all of the coding wheels 61 may be stepped at one time and thus the scrambling of the circuits would be diminished and if fewer than four connections are made there is a possibility that none of the coding wheels 61 might be stepped at some one time.

When switch 56 is in the encipher position the Z key connects to the X lead 102 and the space bar 55 is connected to the Z lead 102, by the switch 56 contact connections 133 and 134, respectively, FIG. 2. Thus, when the Z key is operated the cipher conjugate of X is printed and this will, in deciphering, with connections 133 and 134 in the dotted line positions, give the letter Z in the plain text in place of Z, as XERO for ZERO. However, the letter Z is so seldom used, and the substitution of X for it is so obvious in the words where it occurs, that no difficulty arises.

For deciphering, the connection 135 is moved to the dotted line position to open the circuit to the Z printer magnet 105 and close the circuit to the print suppress magnet 136 so that when the key of the cipher conjugate of Z in the cipher message is operated the impulse that would otherwise have gone to the Z magnet 105 goes to print suppress magnet 136 and prevents the operation of the printer to record any letter so that a space appears in the text.

The fifth position of switch 56 is "decipher." When deciphering a message the alphabet, stepping, and index wheels are all set to the same initial position as when the encipherment of the message was started, so that identical through paths are established. Changing the switch 56 to the decipher position alters the pileups 60 so contacts 101 of keys 54 are connected to the right hand end of the alphabet maze and printer magnets 105 to the left hand end. Thus, the paths through the code wheels 61 being the same as during the enciphering operation, if, say, the N key 54 is operated, consequent upon the appearance of that letter in the enciphered message, the current will traverse N lead 104, go through the wheels 61 to the A lead 103, and thence to the A printing magnet 105, and the letter A, which has been assumed as the plain conjugate of N, will be printed in the deciphered text. In like manner, when the key bearing the cipher conjugate of Z is operated, the current will flow to print suppress magnet 136 and a space will appear in the deciphered text. The space bar 55 is rendered inoperative by action of switch 56 when deciphering.

The second position of switch 56 is "plain." the machine may be used as an ordinary typewriter with switch 56 set at the plain position for recording plain language. The A printer magnet 105 is then directly in circuit with A contacts 101 through pileups 60 and the connection 139 therebetween. The upper pileups 60 remain as shown in FIG. 2 while the movable element of the lower pileup is moved to contact the upper fixed element thereof, thus completing the circuit from the key to the printer magnet. The contact connections 140 and 141 in switch 56 are open in the enciphering and deciphering positions of switch 56 but are closed in the plain position so that the current is supplied to day (—) key 142 and to the numeral keys 143. The printer magnets 105 for these keys are connected to the common lead 106 so that the clutch trip magnet 110 is energized and the shaft 51 is caused to rotate when one of these keys is operated. Also, in the plain position, the contact connection 134 is moved to the dotted line position and establishes a circuit directly from space bar 55 to the print suppress magnet 136, and thence by contacts 107 to clutch trip magnet 110. While the machine is being used for plain typing, the contact connection 118' in switch 56 is opened so that no current is supplied to the stepping magnets 93 and 99. The code wheels and control wheels therefore remain motionless.

The third position of switch 56 is "reset," in which circuits are established to move the alphabet wheels 61 and the stepping wheels 70 to respective predetermined positions to begin the enciphering or deciphering of a message. The zeroizer switch 100 is manually changed from the "operate" to the "zeroize" position, closing circuits through the contact connections 144. The contact 145 is opened and cuts off current supply to the alphabet keys 54 and the space key 55, and hence to the through paths in the alphabet wheels 61.

To reset the code wheels 61 and the control wheels 70 to their initial positions, the blank key 146 and repeat key 147 are held down. The former closes a circuit through the print suppress magnet 136, contacts 107 and 109, to the clutch trip magnet 110, so that shaft 51 is permitted to rotate. Keeping repeat key 147 depressed breaks the circuit through contacts 114 so that no holding circuit is established to the magnet 110 and hence the clutch trip is held disengaged and it is not necessary to release the blank key after each revolution of shaft 51. Cam 117 on shaft 51 closes contacts 118 once during each revolution and permits the current to flow through conductor 148 to the contacts 144 and thence by conductors 149 to the stepping magnets 93 and 99 of the control wheels 70 and code wheels 61 which causes these wheels to be rotated one step each revolution of shaft 51. The stepping of these wheels continues until the peripheral boss 122 on each wheel acts upon the respective contact strip 150 associated with the wheel to break the circuit to the respective stepping magnet by opening contacts 151, leaving them at their "Zero" position.

After all of wheels 61 and 70 have stopped at "zero" due to the opening of the zeroizer contacts 151, the zeroizer switch is manually set to the "operate" position with switch 56 remaining in the "reset" position. With the switches set in these positions, due to the fact that in the reset position of switch 56 the contact 137 is moved to the dotted line position, a circuit is set up from conductor 148 through conductor 152, contact 137, conductor 153, contacts 154, and conductor 155 to a second print suppress magnet 156. There is also established a circuit from conductor 152 by way of conductor 157 to the contact 158 associated with each of the keys 143 of the numerals 1 to 5, the contact 141 being open and de-energizing the contacts 158' of keys 143, numerals 1 to 5. Each of the numeral keys contacts 158 is connected by a conductor 159 to a respective stepping magnet 93 of the control wheels 70. The key of numeral 1 is connected to step the control wheel 70 at the left hand end of the stepping maze, the key of numeral 2 is connected to step the second wheel from the left hand end, etc. Thus by repeatedly operating a numeral key the control wheel governed by the stepping magnet connected thereto can be rotated to any prearranged position to start the encipherment of decipherment of a message. Also, since the switch 100 is in the "operate" position the contacts 131 will be closed, the contact 118' will be closed, and the contacts 144, 121 and 125 will be open. Current will flow through contact 118' thence through conductor 120, the four contacts 128, the through paths in the control wheels 70, conductors 129, index wheels 73, conductors 130, the contacts 131, and conductors 132 to the stepping magnets 99 of the code wheels 61, so that the code wheels will be stepped in a haphazard manner during the final setting of the control wheels 70. It will of course be understood that the code wheels 61 and the stepping wheels 70 may be set manually, if preferred.

The first position of switch 56 is "off." The switch 56 operates a snap switch 160 to control the supply of electric power to motor 50, and to the other electric circuits in the machinery, the machine being supplied with power in all positions of switch 56 except the "off" position. This switch 56 also operates a control to cause automatic separation of the letters in an enciphered message into groups of five and to prevent feeding of the tape upon which the letters are printed when in the reset position. However, since these mechanisms are not a part of the present invention, and are fully shown and described in the concurrently filed application of Howard L. Krum et al Ser. No. 02/568,364, filed Dec. 15, 1944, they are not shown in the present drawings.

Interchangeable resistors 161 of different values are supplied to adjust the impedances of the electromagnet circuits for operation from sources of different voltages, and spark suppressors comprising a resistance 162 and capacitance 163 may be connected at whatever points are desirable.

We claim:

1. In a cyclically operable cryptographic machine having a set of stepwise rotatable code wheels, mechanism conditionable so to rotate said wheels individually, and a respective electrically actuated device associated with each wheel to condition in a random manner said mechanism to step such associated wheel; a set of control wheels each carrying a plurality of conductive elements having their ends randomly connected to contacts at the opposite faces of the respective wheels, means connecting each said element into a respective through path, means to step one of said control wheels each cycle of operation, means to operate meterwise the two wheels adjacent thereto, a fixed input conductor connected to supply current at one end to any four of said through paths positioned to connect therewith, nine fixed output conductors each connected to at least one contact disposed to be in conductive relation with the other end of a respective through path, so that the nine conductors constitute output connections for all the through paths; a set of index wheels each carrying ten conductive elements having their ends randomly connected to contacts at the opposite faces of the respective index wheels, means connecting each index wheel element into a respective index through path each of which except one is conductively connected at one end to a respective said output conductor, and five fixed selector conductors connected to place each in conductive relation with the other ends of two of said index through paths that are positioned to connect therewith, each of the selector conductors being connected to a respective said electrically actuated device to effect stepping of the associated code wheel when current is supplied to the selector conductor, the total number of code wheels so stepped not exceeding four at any one time.

2. In a cyclically operable cryptographic machine having a set of stepwise rotatable code wheels, mechanism conditionable so to rotate said wheels individually, and a respective electrically actuated device associated with each wheel to condition in a random manner said mechanism to step such associated wheel: a set of control wheels each carrying a plurality of conductive elements having their ends randomly connected to contacts at the opposite faces of the respective wheels, means connecting each said element into a respective through path, means to change said through paths in a haphazard manner, a number of fixed input conductors each connected to supply current at one end to a respective through path positioned to connect therewith, said number being not greater than the number of code wheels, a second number of fixed output conductors, greater than the number of said code wheels, disposed to be in conductive relation with the other end of at least one through path so that each through path has an output connection, a set of index wheels each carrying said second number plus one of conductive elements having their ends randomly connected to contacts at the opposite faces of the respective index wheels, means connecting each index wheel element into a respective index through path each of which except one is conductively connected at one end to a respective said output conductor, and fixed selector conductors, equal in number to said code wheels, disposed to be in conductive relation with the other end of at least one of said index through paths so that all the index through paths are connected to the selector conductors, each of the selector conducts being connected to a respective said electrically actuated device to effect stepping of the associated code wheel when current is supplied to the conductor, the total number of code wheels so stepped not exceeding the number of said input conductors at any one time.

3. In a cyclically operable cryptographic machine having a set of stepwise rotatable code wheels, mechanism conditionable so to rotate said wheels individually, and a respective electrically actuated device associated with each wheel to condition in a random manner said mechanism to step such associated wheel: a set of control wheels each carrying a plurality of conductive elements having their ends randomly connected to contacts at the opposite faces of the respective wheels, means connecting each said element into a respective through path, means to change said through paths in a haphazard manner, a number of fixed input conductors, not greater than the number of said code wheels, disposed to supply current at one end to a like number of said through paths positioned to connect therewith, and means to connect to a respective electrically actuated device each of an unpredictable number of said through paths to which current is supplied by said input conductors, the number of through paths so connected in any cycle of operation being not greater than he number of said input conductors, thereby to step the code wheels respectively associated with the said devices thus supplied with current.

4. In a cyclically operable cryptographic machine having a step of stepwise rotatable code wheels, mechanism conditionable so to rotate said wheels individually, and a respective electrically actuated device associated with each wheel to condition in a random manner said mechanism to step such associated wheel: a set of control wheels each carrying a plurality of conductive elements having their ends randomly connected to contacts at the opposite faces of the respective wheels, means connecting each element into a respective through path, said control wheels being mounted for individual stepwise rotation to make possible the changing of said through paths, a number of fixed input conductors, not greater than the number of said code wheels, disposed to supply current at one end to a like number of said through paths positioned to connect therewith, and manes to connect to a respective electrically actuated device each of an unpredictable number of said through paths to which current is supplied by said input conductors, the number of through paths so connected in any cycle of operation being not greater than the number of said input conductors, thereby to step the code wheels respectively associated with the said devices thus supplied with current.

5. In a cyclically operable cryptographic machine having a set of stepwise rotatable code wheels, mechanism conditionable so to rotate said wheels individually, and a respective electrically actuated device associated with each wheel to condition in a random manner said mechanism to step such associated wheel: a set of index wheels each carrying ten conductive elements having their ends randomly connected to contacts at the opposite faces of the respective index wheels, means connecting each element into a respective through path, means to supply current at one end to an unpredictable variable number of said through paths not exceeding four, the paths to which current is thus supplied changing unpredictably from cycle to cycle and five fixed selector conductors disposed to be each in conductive relation with the other ends of two of said through paths that are positioned to connect therewith, each of the selector conductors being connected to a respective said electrically actuated device to effect stepping of the associated code wheel when current is supplied to the conductor, the total number of code wheels so stepped not exceeding four at any one time.

6. In a cyclically operable cryptographic machine having a set of stepwise rotatable code wheels, mechanism conditionable so to rotate said wheels individually, and a respective electrically actuated device associated with each wheel to condition in a random manner said mechanism to step such associated wheel: a set of index wheels each carrying conductive elements greater in number than the number of the code wheels with each element having its ends randomly connected to contacts on opposite faces of the respective wheels, means connecting each element into a respective through path, means to supply current at one end to an unpredictable variable number of said through paths fewer in number than the number of the code wheels, the paths to which current is thus supplied varying unpredictably from cycle to cycle, and fixed selector conductors equal in number to the code wheels disposed to be in conductive relation with the other ends of at least one through path positioned to connect therewith so that all the through paths are connected to the selector conductors, each of the selector conductors being connected to a respective said electrically actuated device to effect stepping of the associated code wheel when current is supplied to the selector conductor, the number of code wheels stepped at any one time being always less than the total number of the code wheels.

7. In a cyclically operable cryptographic machine having a set of stepwise rotatable code wheels, mechanism conditionable so to rotate said wheels individually, and a respective electrically actuated device associated with each wheel to condition in a random manner said mechanism to step such associated wheel: input conductors fewer in number than the code wheels, haphazardly variable paths greater in number than the inputs so disposed that each input is connected to one of the paths, the paths so connected being variable from cycle to cycle, output conductors fewer in number than the paths but greater in number than the input conductors, each output conductor being connected to at least one path so that all the paths are connected to the output conductors, a second set of variable paths equal in number to the number of output conductors plus one, each output conductor being connected to one end of a respective path in the second set, and selector conductors equal in number to said devices, each selector conductor being connected to at least one path of the second set so that all paths of the second set are connected to the selector conductors, each selector conductor being also connected to a respective said device, and a path of the second set with which any selector conductor is conductively associated being connected or not connected through to the inputs by the output conductors and the haphazardly variable paths depending upon the fortuitous arrangement of the haphazardly variable paths.

8. In a cyclically operable cryptographic machine having a set of stepwise rotatable code wheels, mechanism conditionable so to rotate said wheels individually, and a respective electrically actuated device associated with each wheel to condition in a random manner said mechanism to step such associated wheel: a set of index wheels each carrying conductive elements greater in number than the number of the code wheels with each element having its ends randomly connected to contacts on opposite faces of the respective wheels, means connecting each element into a respective through path, means to supply current at one end to an unpredictably variable number of said through paths not greater in number than the number of the code wheels, the paths to which current is thus supplied varying unpredictably from cycle to cycle, and fixed selector conductors equal in number to the code wheels disposed to be each in conductive relation with the other ends of at least one through path positioned to connect therewith so that all through paths are connected to the selector conductors, each of the selector conductors being connected to a respective said electrically actuated device to effect stepping of the associated code wheel when current is supplied to the selector conductor, the variation in the through paths to which current is supplied providing that the number of code wheels operated and the individual code wheels operated shall vary from cycle to cycle.

9. In a cryptographic machine having a printing device, a keyboard that includes character keys and mechanical operation keys, a plurality of cryptographic and printing circuits each of which includes a character key and said printing device, and operating circuits each including a mechanical operation key, said circuits being combinable into different groups to effect encipherment, decipherment, and plain printing of text and to reset said cryptographic circuits to an initial condition: a switch to condition the circuits for operation in the groups aforesaid comprising a plurality of contact pileups whereof each contact pair is connected to a respective circuit and a rotatable shaft having a plurality of cam lobes disposed to actuate the contacts of the pileups to group said circuits for enciphering in one position of the shaft, for deciphering in a second position thereof, for plain printing in a third position thereof, and for resetting said cryptographic circuits in a fourth position thereof.

10. In a cryptographic machine having a printing device, a keyboard that includes character keys and mechanical operation keys, a plurality of cryptographic and printing circuits each of which includes a character key and said printing device, and operating circuits each including a mechanical operation key, said circuits being combinable into different groups to effect encipherment, decipherment, and plain printing of text and to reset said cryptographic circuits to an initial condition: a switch to condition the circuits for operation in the groups aforesaid comprising a plurality of contact pileups whereof each contact pair is connected to a respective circuit and a rotatable shaft having a plurality of cam lobes disposed to actuate the contacts of the pileups to group said circuits for enciphering in one position of the shaft, for deciphering in a second position thereof, for plain printing in a third position thereof, and for resetting said cryptographic circuits in a fourth position thereof; and a second switch having operate and zeroize positions, said second switch including pairs of contacts closable to vary said groupings, said second switch being in the operate position for enciphering, deciphering and plain printing, in the zeroize position while the first switch is in the reset position to reset the cryptographic circuits, and in the operate position while the first switch is in the reset position to condition circuits including said mechanical operation keys for effecting certain mechanical operations determinative of the connections in the cryptographic circuits.

11. In a cryptographic machine having a plurality of individually rotatable code wheels each carrying the same number of conductive elements, a printing device, alphabet keys, numeral keys, mechanical operation keys, space bar, means to combine each conductive element in each wheel into a coding circuit with an element in every other wheel, each such circuit including an alphabet key and said device, and controlling means to effect haphazard rotation of the coding wheels: a first switch having four operating positions in the third of which said switch conditions circuits for the alphabet keys through the coding wheels to the printing device to print a cipher conjugate letter when an alphabet key is closed, in the fourth of which said switch reversely conditions said circuits to print the plain conjugate when the key bearing the cipher conjugate is closed, and in the first of which said switch conditions circuits to print the letter or numeral on the key operated and to render said controlling means inoperative, and a second switch having operate and zeroize positions in the former of which positions it cooperates with said first switch to condition the circuits as aforesaid; said second switch in the zeroize position cooperating with the first switch in the second position to condition the circuits to reset the coding wheels and controlling mechanism to an initial condition and in the operate position to condition circuits whereby closing of certain numeral keys effects additional adjustment of the controlling means.

12. In a coding and decoding machine, a cryptographic unit comprising means providing a first, a second, and a third group of haphazardly variable electric current paths, input means to supply current to a fixed number of paths in said second group less than the total number thereof, output means connected to a number of paths in said second group greater than said fixed number but fewer than the number of paths in said second group and also connected as inputs to paths in said third group, other output means connected as inputs to paths in said third group, other output means connected to paths in said third group greater in number than said fixed number but fewer than the inputs to said third group, means responsive to current in said other output means to effect variations in the paths of said first group, the number of such variations at any one time being not greater than said fixed number, circuit closing means equal in number to the paths in said first group each variably connectible unpredictably to a respective path in said first group, means responsive to the operation of a said circuit closing means to effect a variation in the paths of said second group, means operative upon completion of a cycle of such variations in said second group to effect a second variation in the paths of said second group, and means operative upon completion of a cycle of said second variations in the paths of said second group to effect a third variation in the paths of said second group.

13. In a cryptographic machine, a cryptographic unit comprising a set of code wheels, a set of control wheels and a set of index wheels, means providing a plurality of through paths in each of said sets, said wheels being individually rotatable to vary said paths, actuating means respective engageable with each said code wheel and each said control wheel to effect stepwise rotation thereof, and a respective electromagnet disposed to condition each actuating means to engage the wheel associated therewith: a plurality of circuit closing means each connected to close a circuit through a respective through path in said code wheels, means to energize a said electromagnet to step one control wheel each time a circuit is closed as aforesaid, means actuated by said one control wheel to effect meterwise stepping of at least one other control wheel, and means including the through paths in said control wheels and said index wheels to effect stepping of said code wheels in unpredictable sequences and combinations.

14. In a cryptographic machine, a cryptographic unit comprising a set of code wheels, a set of control wheels and a set of index wheels, mean providing a plurality of through paths in each of said sets, said wheels being individually rotatable to vary said paths, actuating means respectively engageable with each said code wheel and each said control wheel to effect stepwise rotation thereof, and a respective electromagnet disposed to condition each actuating means to engage the wheel associated therewith: a plurality of circuit closing means each connected to close a circuit through a respective through path in said code wheels, means to energize a said electromagnet to step one control wheel each time a circuit is closed as aforesaid, means actuated by said one control wheel to effect meterwise stepping of two more of said control wheels, means including the through paths in said control wheels and said index wheels to effect stepping of said code wheels in unpredictable sequences and combinations, means connected to energize all said electromagnets continuously to effect repeated stepping of all said coding wheels and said control wheels so long as the circuit is closed therethrough, and a pair of closed contacts interposed in circuit with each said electromagnet and disposed to be opened by a peripheral boss on the respective wheel to stop each such wheel at a predetermined zero position.

15. In a cryptographic machine having alphabet keys, a space bar, a plurality of individually movable members each carrying conductive elements equal in number to the alphabet keys, means to combine each conductive element into a through coding circuit that includes an alphabet key and an electromagnet to effect printing of an alphabet character when the key is operated, a printing device controlled by said magnets, and means including circuits closable by the operation of any said key to effect haphazard movement of said members: a first switch including a rotatable shaft carrying a plurality of cam lobes having encipher, decipher, plain, and reset positions and a plurality of contact pileups disposed to be acted upon by said lobes to condition said circuits to be energizable in a different grouping in each said position, and a second switch having operate and zeroize positions to vary the grouping of said circuits; the second switch in the operate position and the shaft in the encipher position actuating contacts to condition circuits from all the alphabet keys except Z to connect each said circuit to a respective coding through path, from the Z key to the X key circuit, from space bar to the Z key circuit, and to the means to effect movement of said members, and in the decipher position of the shaft to reverse the connections of each said circuit to its respective coding through path and to connect the Z output circuit to cause a space, the Z key to the Z key circuit, and to disconnect the space bar and render it inoperative.

16. In a cryptographic machine having alphabet keys, numeral keys, a dash key, a space bar, a plurality of individually movable members each carrying conductive elements equal in number to the alphabet keys, means to combine each conductive element into a through coding circuit that includes an alphabet key and an electromagnet to effect printing of an alphabet character when an alphabet key is operated, a plurality of circuits each including a numeral key and an electromagnet to effect printing of a numeral when the corresponding numeral key is operated, a printing device controlled by said magnets, and means including circuits closable by the operation of any alphabet key to effect haphazard movement of said members: a first switch including a rotatable shaft carrying a plurality of cam lobes having encipher, decipher, plain and reset positions and a plurality of contact pileups disposed to be acted upon by said lobes to condition said circuits to be energizable in a different grouping in each position, and a second switch having operate and zeroize positions to vary the grouping of said circuits; the second switch in the operate position and the shaft in the plain position actuating contacts to condition circuits from each of said keys to print the character on such key when operated, to connect the space bar circuit to cause a space, and to open the circuits that effect movement of said members.

17. In a cryptographic machine having a plurality of individually rotatable code wheels each carrying the same number of conductive elements, means to combine each conductive element into a through coding circuit, individually rotatable control wheels to effect haphazard operation of the code wheels, each of said wheels having a peripheral boss, means to rotate stepwise all of said wheels, a respective electromagnet to condition said means to step each wheel when energized, a printing device controlled by said coding circuits, numeral keys and a blank key: a respective energizing circuit to each electromagnet including a pair of normally closed contacts disposed to be opened by the boss on the wheel with which the magnet is associated, at a predetermined point in the rotation of the wheel; a first switch including a rotatable shaft carrying cam lobes having encipher, decipher, plant and reset positions and a plurality of contact pileups actuatable by said lobes to condition circuits to be energizable in a different grouping for each position of the shaft, and a second switching having operate and zeroize positions to vary the said grouping of the circuits; the shaft in reset position and the second switch in the zeroize position actuating contacts to condition the circuits to energize all said electromagnets when the blank key is operated until the boss on the respective wheel opens the contacts in the circuit to the magnet associated therewith, to open the coding circuits, to condition a circuit from a respective numeral key to each control wheel magnet, not including said normally closed contacts, and to prevent operation of the printing device; and with the second switch in the operate position to open the zeroizing circuits and to close the stepping circuit to the code wheel magnets.

18. In a cryptographic machine having a plurality of code wheels and control wheels, each said wheel being individually stepwise rotatable and having a peripheral boss, means to step said wheels, and a respective electromagnet associated with each wheel to condition said means to step the wheel when the magnet is energized: circuits to energize said magnets including a key closable to complete said circuits, a pair of normally closed contacts in the circuit to each magnet disposed to be openable by the boss on the associated wheel to stop each wheel in a predetermined initial position, although the circuit remains otherwise closed, and a circuit to each control wheel magnet not including said contacts and closable by a respective key whereby the control wheels may be individually set to predetermined positions.

19. In a cryptographic machine having a first and a second group of haphazardly variable current paths, a group of random current paths, a plurality of mechanisms conditionable to effect variations in the paths of the first group, and an electromagnet individual to each mechanism to condition the same for operation: means to supply current to a fixed number of paths in the second group, a respective conductive connection between each random path and a path in said second group, and a respective conductor connecting each electromagnet to a random group, current being supplied to a variable number of said random paths in haphazard combinations of the random paths by variations of the paths in the second group.

20. In a cryptographic machine having a plurality of groups of haphazardly variable current paths, a group of random current paths, a plurality of mechanisms conditionable to effect varied current paths in the first of said plurality of groups, and electric means individual to each mechanism to condition the same for operation: means to supply current to a fixed number of paths in a group following said first group, a conductive connection between each random path and a path in said group following said first group, and a conductive connection between each of said electrical means and a random path, current being supplied to a variable number of said random paths in haphazard combinations of the random paths by variations of the paths in the group following said first group.

21. In a cryptographic machine, a cryptographic unit comprising a set of code wheels, a set of control wheels and a set of index wheels, means providing a plurality of through paths in each of said sets, said wheels being individually rotatable to vary said paths, actuating means, electrical means associated with said actuating means, said actuating means being responsively conditioned by an individual electric means for engaging each of said code wheels and each of said control wheels to effect stepwise rotation thereof: a plurality of circuit closing means each connected to close a circuit through a respective through path in said code wheels, means to supply current to one of said electric means associated with said actuating means to step one control wheel each time a circuit is closed as aforesaid, means actuated by said one control wheel to effect rotation of at least one other control wheel one step in response to one revolution of said first named control wheel, and means including the through paths in said control wheels and said index wheels to effect stepping of said code wheels in unpredictable sequences and combinations.

* * * * *